June 16, 1953 — W. J. COX — 2,642,265
TIRE TOOL
Filed July 24, 1950 — 2 Sheets-Sheet 1
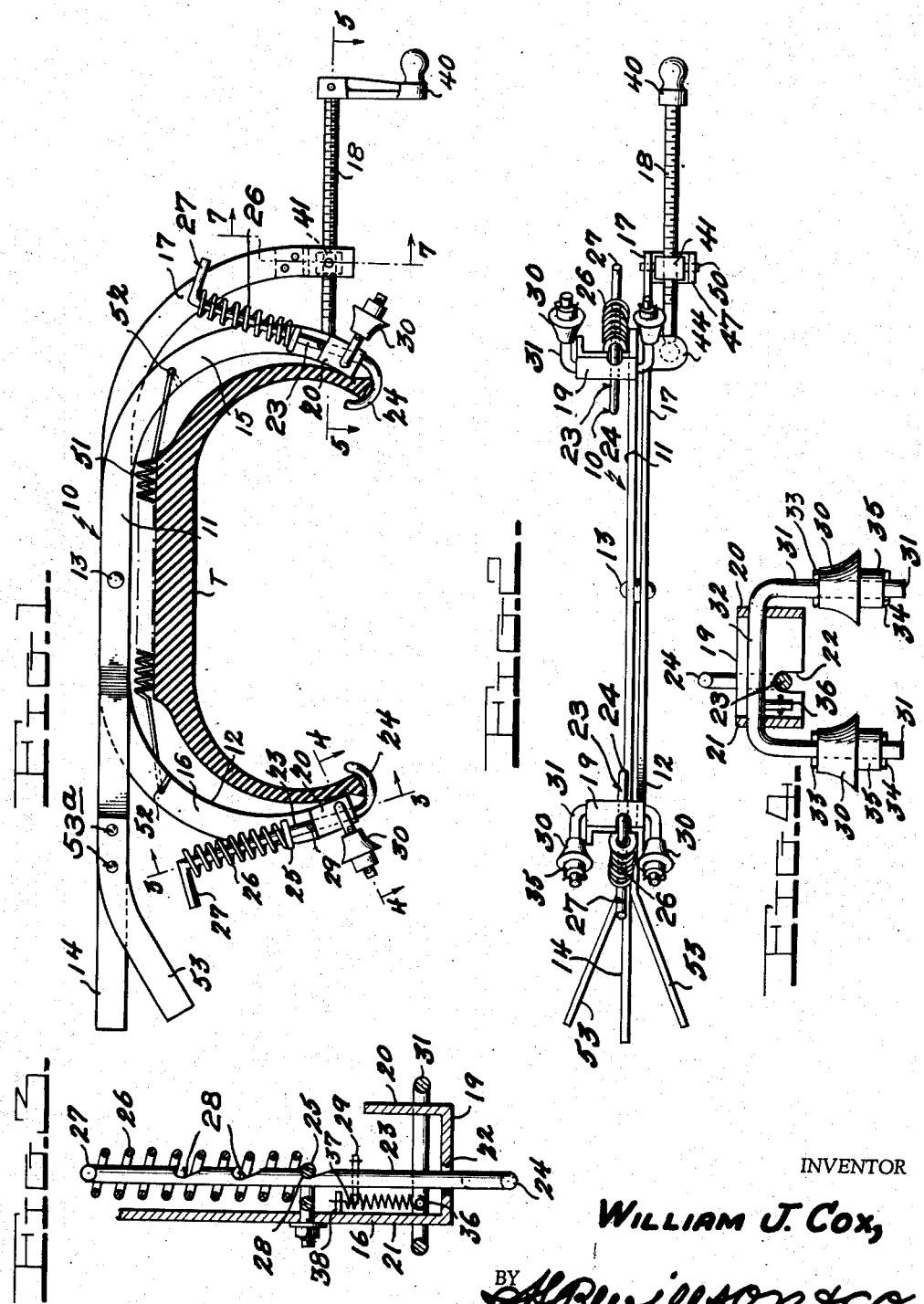
INVENTOR
WILLIAM J. COX,
BY H.B.Willson&Co.
ATTORNEYS June 16, 1953 W. J. COX 2,642,265
TIRE TOOL
Filed July 24, 1950 2 Sheets-Sheet 2
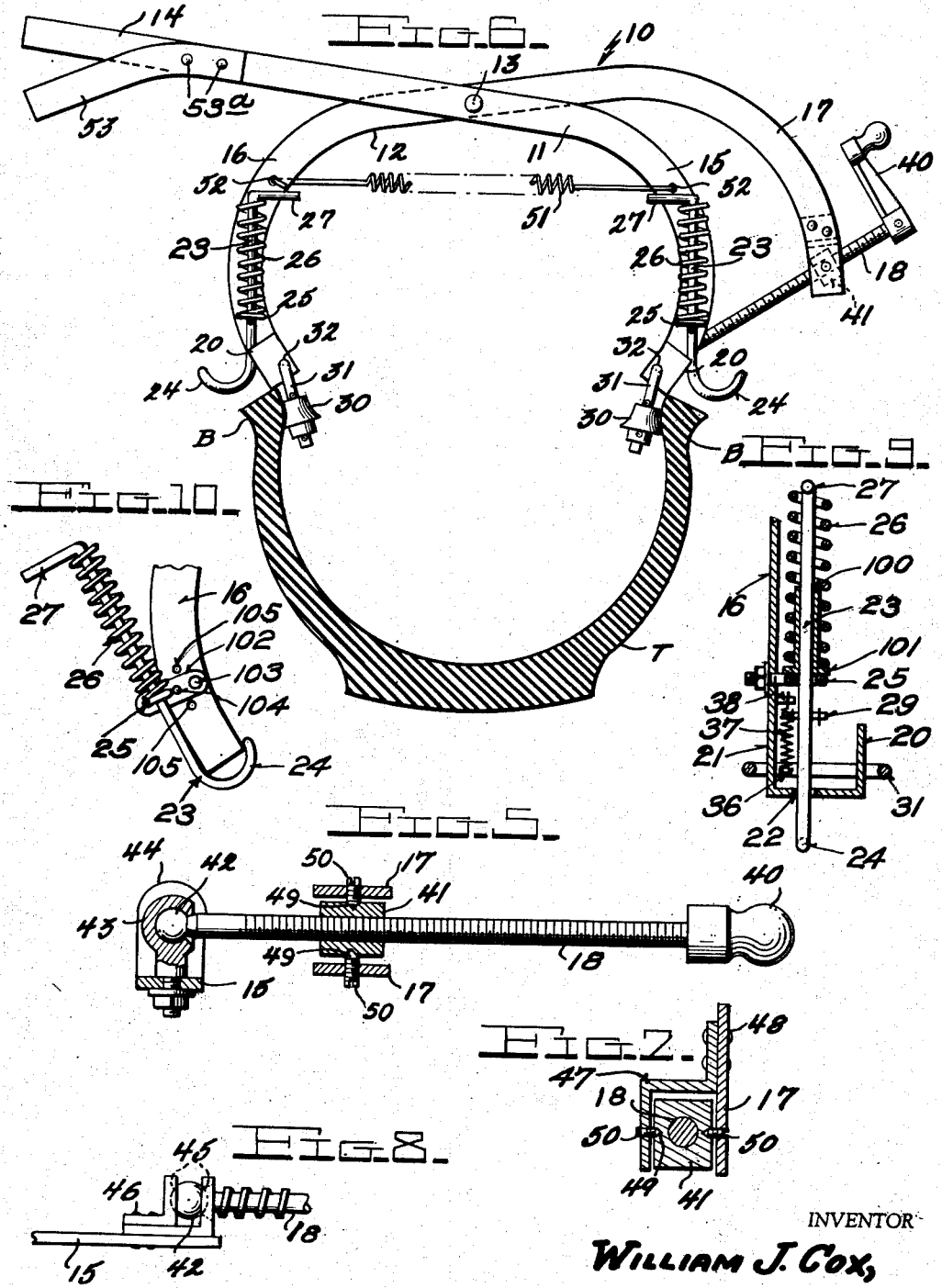
INVENTOR
WILLIAM J. COX,
BY H. B. Willson & Co.
ATTORNEYS Patented June 16, 1953

2,642,265

UNITED STATES PATENT OFFICE 2,642,265

TIRE TOOL

William Jared Cox, Woodruff, Utah

Application July 24, 1950, Serial No. 175,606

8 Claims. (Cl. 254—50.1)

This invention relates to tire tools and more particularly to improvements in the tool of my Patent No. 2,474,515 granted June 28, 1949. In the tire spreading tool of that patent detachable casing-bead engaging hooks were used and they frequently were lost or misplaced. That tool also required great strength on the part of the user to operate the hand levers, especially when the tool was used on large size tire casings. Further, that tool was found to have other disadvantages. It is, therefore, an object of the present invention to overcome these disadvantages of my prior device.

My new tire spreading tool, while intended to serve the same purposes and uses as the former device, is so constructed that there are no detachable parts, and an operating screw is provided between the jaw-carried levers to permit of their easy operation and to lock or hold them in the position to which they are adjusted. Further novel features and advantages will be pointed out in the following description of the present preferred construction shown in the accompanying drawings, in which:

Figure 1 is a transverse section through a tire casing and showing my improved tool in side elevation applied across the exterior of the casing to spread its beads;

Fig. 2 is a bottom view of the tool with its parts in the position shown in Fig. 1, the spring connecting the two levers being omitted;

Figs. 3, 4 and 5 are detail sectional views taken respectively on the lines 3—3, 4—4 and 5—5 of Fig. 1;

Fig. 6 is a view similar to Fig. 1 but showing the manner of using the tool across the inner circumstance of a tire casing;

Fig. 7 is a detail section on line 7—7 of Fig. 1; and

Fig. 8 is a detail showing another way of mounting the screw for rotation and universal angular movement;

Fig. 9 is a detail sectional view similar to Fig. 3 but showing a modification; and Fig. 10 is a detail view showing a further modification.

Referring more in detail to the drawings T denotes a tire casing having the usual beads B, and 10 denotes as a whole my improved spreading tool which may be applied either across the outer side or tread of the casing, as shown in Fig. 1, or across the inner portion or beads, as seen in Fig. 6. The tool comprises two crossed levers 11 and 12 pivotally connected between their ends at 13. The lever 11 is substantially J-shaped having a straight outer or rear end 14 and a longitudinally curved inner or front end 15. The lever 12 is substantially U-shaped or C-shaped having a longitudinally curved inner end 16 and a similarly curved outer end 17 which is moved toward and from the end 15 of the other lever by a screw 18 as later described. The inner ends 15 and 16 of the two levers are in opposed relation to form tire actuating jaw portions. Each of the latter carries similar bead engaging elements so that the tool may be used either across the exterior or the interior circumference of the casing.

The jaw portions 15 and 16, and the bead engaging devices upon them are of the same construction. The levers are preferably formed of flat metal bars, and the inner extremities of the jaw portions 15 and 16 are bent at right angles to form transverse portions or plates 19 and then again bent to form portions or lugs 20 parallel with the flat opposed portions 21 at the inner ends of the two jaw members as seen in Fig. 3. Slidable freely through a notch or opening 22 in each of the plates 19 is the straight shank portion 23 of a bead engaging hook 24. These hooks 24 are employed when the tool is used as seen in Fig. 1. The two shanks 23 pass through guides 25, which may be in the form of eyebolts carried by the portions 21, and also through coil springs 26, the latter thrusting at one end against the guide eyes and at the other against stops 27 on the hook shanks 23. The stops 27 are preferably in the form of right angularly bent arms at the extremities of the shanks, the arms serving as handles for manipulating the hooks 24. The hooks are movable toward and from the ends of the jaw portions 15 and 16 to permit the tool to be used on tire casings of different sizes. By the use of the stops 27 the hooks may be moved against the tension of the springs 26 to facilitate the engagement of the hooks with the beads of the casing and the hooks may be rotated axially of their shanks to turn them to an out-of-the-way or inoperative position, as shown in Fig. 6, when the tool is to be used as shown in that view.

If desired, I may lock the hooks in different positions of longitudinal adjustment by providing their shanks 23 with a plurality of longitudinally spaced notches 28, any one of which may be engaged with the eye-bolt 25 as will be understood upon reference to Fig. 3. The opening in the eye-bolt or guide has a larger diameter than that of the hook shank so that by pressing the latter laterally and moving it endwise, any of the notches may be engaged with the eye-bolt. With that construction the spring 26 need not be so stiff, and at no time will it be fully compressed. If desired, a cotter pin or other stop pin 29 may be provided in each shank 23 to engage the guide or stop 25 to limit the upward or outward movement of the hook under the action of the spring.

When the tool is to be used as shown in Fig. 6 across the beads B, the latter are engaged with pairs of substantially frusto-conical shaped rollers 30 carried by the jaw members 15 and 16. The rollers of each pair are spaced from each other in a direction circumferentially with respect to the beads B and laterally with respect to the plane in which the levers move. The peripheries of the rollers are slightly concaved or shaped to engage the inner opposite walls of the casing at the beads, and, hence, facilitate the shifting of the tool around the inner circumference of the casing when it is spread open by the tool. The rollers of each pair are mounted for rotation on the straight and parallel arms 31 of a U-shaped hanger 32 which is pivoted for limited swinging movement in the U-shaped end portion 20, 19, 21 of one of the jaw members 15, 16, as seen in Fig. 4. The rollers are preferably retained on the arms 31 between spaced cotter pins 33 and 34 or the like, sleeves 35 being interposed between the rollers and the outer cotter pins 34. The cross portion of the U-shaped hanger turns in bearing openings in the parts 19, 21 and its rotating movement in one direction is limited by a stop arm or pin 36 when the latter engages the plate or cross portion 19. The parts are in that position when the rollers are engaged with the inner sides of the beads to spread them as in Fig. 6. When the rollers are not so engaged, they are swung upwardly and laterally in an outward direction by a coil spring 37 connected at one end to the stop pin or arm 36 and anchored at its other end to a pin 38 on the portion 21 of the lever. It will be seen that the spring will normally swing the hanger arms to hold the rollers out of the way when the hooks 24 are to be used.

The lever actuating screw 18, which moves the jaws 15, 16 toward and from each other, is preferably of the square thread type and has a suitable crank handle 40 on its outer end. The screw threaded bar 18 is disposed cross-wise of the spaced curved jaw portions 15 and 17 of the two levers and passes through a swiveled nut 41 carried by the outer end portion 17 of the lever 12. The screw bar 18 has it inner end connected for rotation and univeral anguiar movement to the jaw portion 15 of the lever 11. As shown in Fig. 5 a ball 42 is formed on the inner end of the screw and has rotatable and angular movement in a socket 43 carried by a bracket 44 suitably secured to one side of the jaw portion 15. If desired, the ball may be mounted, as shown in Fig. 8, between semispherical seats formed in the spaced portions 45 of two angular brackets secured as at 46 to the portion 15. The nut 41 is preferably swiveled by positioning it between one side of the lever end 17 and an arm of an angle bracket 47 secured at 48 to said end, and by providing it at opposite sides with conical pivot seats 49 to receive the pointed ends of two screws 50 as shown in Fig. 7.

When the tool is to be used astride the exterior of the casing and the hooks 24 are used to spread the same, as in Fig. 1, I find it desirable to provide a coil spring 51 between the jaw portions 15 and 16. This spring has its intermediate portion engaged with the tread of the casing and prevents the jaws from dropping too far down on small size tires. Its use makes it easier to engage the hooks 24 over the tire beads. The ends of the spring 51 are engaged with openings 52 in the jaw portions, and these openings may be positioned closer to the extremities of the jaws than shown in Fig. 1, or a series of the openings 52 may be provided in each of the portions 15, 16 for the reception of the hooks on the ends of the spring.

When the tool is used, it is frequently desirable to support the tire substantially horizontal on the floor or ground with its spread portion slightly elevated. By making the straight outer end 14 of the lever 11 sufficiently long and attaching to its opposite sides laterally and angularly extending straps or props 53, as shown in Figs. 1 and 2, I form a stand or support for the spread portion of the casing. The straps are angular and have their inner ends fastened by rivets 53a so that their diverging outer ends in connection with the end 17 form a sort of tripod which holds the casing steady and slightly elevated.

In the modification shown in Fig. 9, I omit the notches 28 of Fig. 3, and employ a stop sleeve 100 to limit the compression of the spring 26. The sleeve surrounds the hook shank 23 within the spring 26 and has at one end an annular flange 101 interposed between the eye 25 and the adjacent end of the spring. The other end of the sleeve forms a stop to be engaged by hand piece 27 when the spring is fully compressed.

In Fig. 10 I have shown diagrammatically an alternative form of adjustment for the hook 24 to take the place of the notches 28 and to adapt the tool for use on tire casings of different sizes. In this form the screw eye 25 is mounted in the free end of a flat link 102 which has its other end pivoted at 103 on the jaw portion 16 and/or 15. The link 102 swings on the pivot 103 and is secured in an adjusted position by a pin, bolt or the like 104 passed through an opening in an intermediate portion of the link and through any one of an arcuate series of openings 105 formed in the jaw portion concentric with the pivot 103. The shank member 23 having the hook 24 may thus be adjusted toward and from the end of the jaw portion of the lever according to the size of the tire casing to be spread. The stop sleeve 100 of Fig. 9 is preferably used in the structure of Fig. 10 although not shown in that view.

It is to be understood that the above and other variations may be employed in making the tool, according to its intended use or uses; and that while I have shown and described the rollers 30 on both jaw portions as being movable to out-of-the-way positions, the roller or rollers 30 on the jaw portion 15 adjacent the operating screw 18 may be non-swingably mounted. In other words the rollers on only one side of the tool need be swingable to an out-of-the-way position.

It is believed the operation and uses of the tool will be apparent from the foregoing detailed description. The tool may be used on tire casings of various sizes and because of the use of the screw for operating the jaws, very little physical exertion is necessary, even when large size casings are to be spread. The jaws are easily moved toward or from each other when the crank handle is rotated and the bead engaging parts on the jaws may be readily manipulated so that either set may be used according to whether it is desired to use the tool across the tread or the beads. When both the hooks 24 and the rollers 30 are swung outwardly to inoperative positions the straight or cross portions 19 of the U-shaped ends of the jaw members may be engaged with the outer surfaces of the beads B so that by turning the crank 40 in the proper direction the screw 18 may be used to force the beads toward each other. The screw 18 not only serves as an actuator for the jaw members but also locks them in the position to which they are moved. When the casing is spread by the use of the rollers, the entire tool may be shifted circumferentially around the tire to facilitate the location of nails, breaks, etc. The tool has no detachable parts which might be lost or misplaced and is much easier to apply and operate than the one of my previous patent.

From the foregoing, taken in connection with the accompanying drawing, it will be seen that novel and advantageous provision has been made for carrying out the objects of the invention, and while preferences have been disclosed, variations may, of course, be made within the scope of the invention as claimed.

I claim:

1. A tire casing spreader comprising a pair of crossed levers pivotally connected intermediate their ends, the inner ends of said levers being longitudinally curved and arranged in opposed relation to provide jaw forming portions, one of said levers having its outer end curved longitudinally to dispose it in outwardly spaced relation to the curved inner end of the other of said levers, a swiveled nut carried by the end of said one lever, a manually actuated screw in said nut, a ball and socket connection between the inner end of said screw and the adjacent jaw portion of the other of said levers, and means carried by said jaw portions to engage the beads of a tire casing, said means comprising bead engaging hooks slidably mounted on said jaw portions, and spring means for retracting said hooks.

2. The structure of claim 1 together with a coil spring connected between said jaw portions and engageable with the tread of a tire casing when the tool is used astride the latter.

3. The structure of claim 1 together with means for holding said hooks in different positions of adjustment longitudinally of said jaw portions.

4. A tire casing spreader comprising a pair of crossed levers pivotally connected intermediate their ends, the inner ends of said levers being longitudinally curved and arranged in opposed relation to provide jaw forming portions, one of said levers having its outer end curved longitudinally to dispose it in outwardly spaced relation to the curved inner end of the other of said levers, a swiveled nut carried by the end of said one lever, a manually actuated screw in said nut, a ball and socket connection between the inner end of said screw and the adjacent jaw portion of the other of said levers, the extremities of said jaw portions having flat opposed portions connected by transverse plates, and U-shaped hangers having parallel arms connected by cross portions, the latter extending through and being rotatable in said flat opposed portions, and the arms having portions to engage the inner sides of the tire beads.

5. The structure of claim 4 together with stop arms carried by the cross portions of said hangers and engageable with said transverse plates to limit the swinging movement of said arms in one direction, and spring means acting on said stop arms to swing said parallel arms in the opposite direction.

6. A tire casing spreader comprising a pair of crossed levers pivotally connected intermediate their ends, one of said levers being C-shaped with opposed curved ends, the other of said levers being J-shaped with a straight outer end and a longitudinally curved inner end disposed in inwardly spaced relation to one of the curved ends of said C-shaped lever, the other curved end of the latter and the curved end of said J-shaped lever forming opposed jaw portions carrying means to engage the beads of a tire casing, a swiveled nut carried by the curved outer end of said C-shaped lever, a manually actuated screw in said nut, a ball and socket connection between the inner end of said screw and the curved jaw portion of said J-shaped lever, means carried by the jaw portions of the two levers to engage the beads of a tire casing, and a pair of angular arms disposed on opposite sides of the straight outer portion of said J-shaped lever, said angular arms having their inner ends secured to said straight portion at a point spaced inwardly from its outer end, the outer portions of said angular arms diverging outwardly and laterally from each other and from the end portion of the lever between them to form with the latter a three-point ground engaging prop to support the tool when applied to a tire casing and hold the engaged portion of the tire casing off of the ground.

7. A tire casing spreader comprising a pair of crossed levers pivotally connected intermediate their ends, the inner ends of said levers being longitudinally curved and arranged in opposed relation to provide jaw forming portions, one of said levers having its outer end curved longitudinally to dispose it in outwardly spaced relation to the curved inner end of the other of said levers, a swiveled nut carried by the end of said one lever, a manually actuated screw in said nut, a ball and socket connection between the inner end of said screw and the adjacent jaw portion of the other of said levers, tire bead engaging hooks having shanks with stops at their outer ends and a row of longitudinally spaced notches on their intermediate portions, guides on said jaw portions through which said shanks slide and in which they have lateral movement to permit the notches to be engaged with and disengaged from said guides, and coil springs on said shanks between said guides and said stops.

8. A tire casing spreader comprising a pair of crossed levers pivotally connected intermediate their ends, one of said levers being C-shaped with opposed curved ends, the other of said levers being J-shaped with a straight outer end and a longitudinally curved inner end disposed in inwardly spaced relation to one of the curved ends of said C-shaped lever, the other curved end of the latter and the curved end of said J-shaped lever forming opposed jaw portions carrying means to engage the beads of a tire casing, a screw threaded bar disposed cross-wise of the said spaced curved portions of the two levers, a ball on the inner end of said screw bar, a socket bearing on the curved jaw portion of said J-shaped lever and in which said ball is revolvably received thereby mounting said screw bar for rotation on its longitudinal axis and for universal angular movement, a traveling nut on said screw bar and formed on its opposite sides with diametrically opposed pivot seats, axially alined pivots engaged with said seats and carried by the curved end of the C-shaped lever which is spaced from the jaw portion of the J-shaped lever, and a handle at the outer end of said screw bar for rotating the latter.

WILLIAM JARED COX.

References Cited in the file of this patent
UNITED STATES PATENTS

| Number | Name | Date |
|---|---|---|
| 1,847,772 | Larson | Mar. 1, 1932 |
| 2,474,515 | Cox | June 28, 1949 |
| 2,528,362 | Hauta | Oct. 31, 1950 |